Aug. 23, 1932.  J. L. DRAKE  1,872,692
APPARATUS FOR MAKING LAMINATED GLASS
Filed June 8, 1928   2 Sheets-Sheet 1

Inventor
John L. Drake
By Frank Fraser
Attorney

Aug. 23, 1932.  J. L. DRAKE  1,872,692
APPARATUS FOR MAKING LAMINATED GLASS
Filed June 8, 1928   2 Sheets-Sheet 2
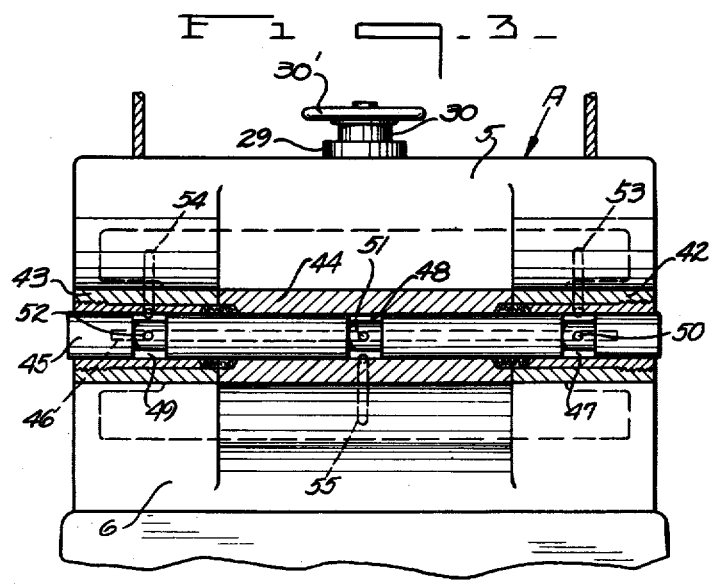
Inventor
John L. Drake
By Frank Fraser
Attorney Patented Aug. 23, 1932

1,872,692

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR MAKING LAMINATED GLASS

Application filed June 8, 1928. Serial No. 283,755.

The present invention relates to an apparatus for use in the manufacture of composite or laminated sheet glass.

The general object of this invention is to provide an improved means for making a compound transparent or translucent laminated sheet composed of two or more sheets of glass with an interposed layer or layers of non-brittle material bonded or united to the glass sheets to form a unitary structure preferably by the combined action of heat and pressure.

One method ordinarily practiced in the production of laminated glass consists in placing the assembled sheets or layers of material to be joined between a pair of resilient diaphragms or within a flexible container, said diaphragms or container being positioned within a suitable pressure chamber. A suitable liquid is then caused to circulate in a heated condition and at different pressures both above and beneath the diaphragms or container whereby heated liquid is circulated for a desired period of time required to properly soften the bonding material and/or the interposed layer or layers of non-brittle material after which the liquid is adapted to be circulated under pressure thereby acting upon the diaphragms or container and the contents thereof to secure adhesion and effect the union of the assembled sheets or layers of material.

An important object of the present invention is the simplification of apparatus used for joining or uniting the several laminations or assembled sheets of material and for facilitating and simplifying the operation thereof. This invention is designed to provide a more convenient means for uniting the laminations so that the labor involved is less and the time required is reduced. Thus, the invention aims to simplify, render more efficient and improve generally the production of glass of this character.

Another object of the invention is the provision of a novel method of and means for controlling the heating of the assembled sheets or laminations and for also controlling the application of pressure thereto.

Another object of the invention is the provision of a novel method for uniting the assembled sheets of material wherein the heating of and pressure upon the said sheets to be joined is effected by the use of a non-circulating liquid under pressure, the pressure being created by displacement of said liquid.

A further object is to provide an improved type of apparatus including a "sheet" containing chamber or compartment within which the superimposed sheets or assembled layers of material to be joined are adapted to be placed, the apparatus being so constructed that the interior of said chamber or compartment is readily accessible so that the assembled layers of material to be joined may be placed therein or the finished composite sheet removed therefrom in any easy and convenient manner and without the necessity of disassembling any part of the apparatus.

The present invention contemplates the utilization of a sectional housing, each section carrying a flexible diaphragm and between which diaphragms the assembled sheets of material to be joined are adapted to be placed, novel means being provided for securing or coupling the housing sections together during the uniting or joining operation.

The invention further embodies means of a novel character for effecting an equalization of the pressure upon the diaphragms and the contents thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention.

Fig. 3 is a section taken substantially on line 3—3 of Fig. 1.

Fig. 4 is a sectional view of a sheet of laminated glass, and

Fig. 5 is a detailed view of the apparatus.

Figure 1:
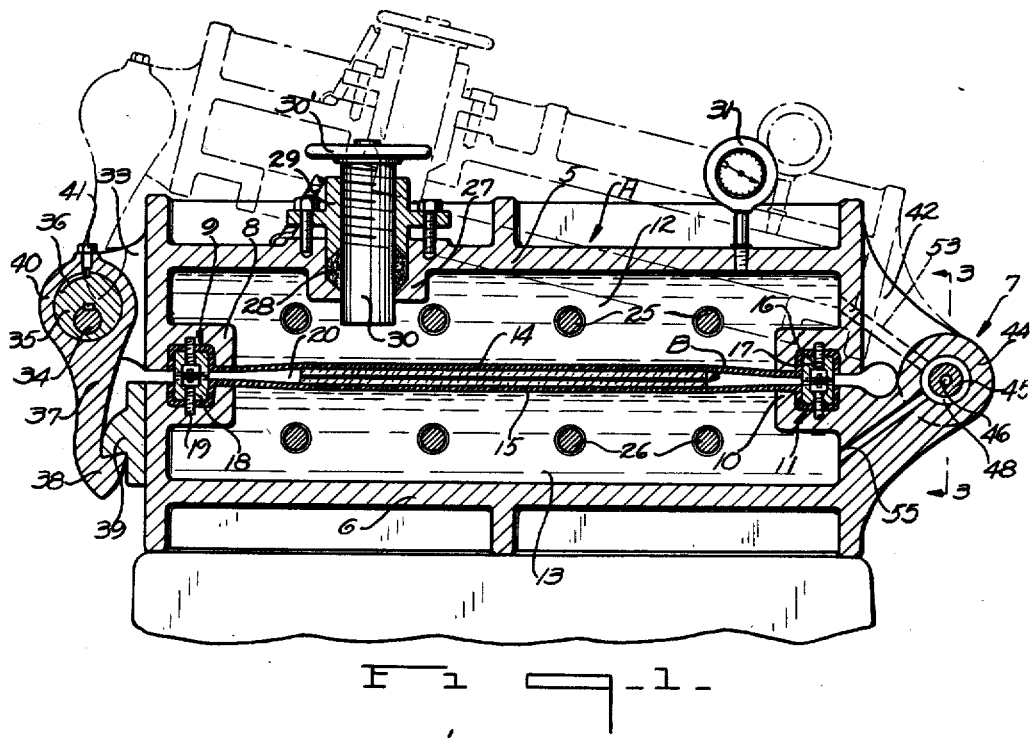
Figure 2:
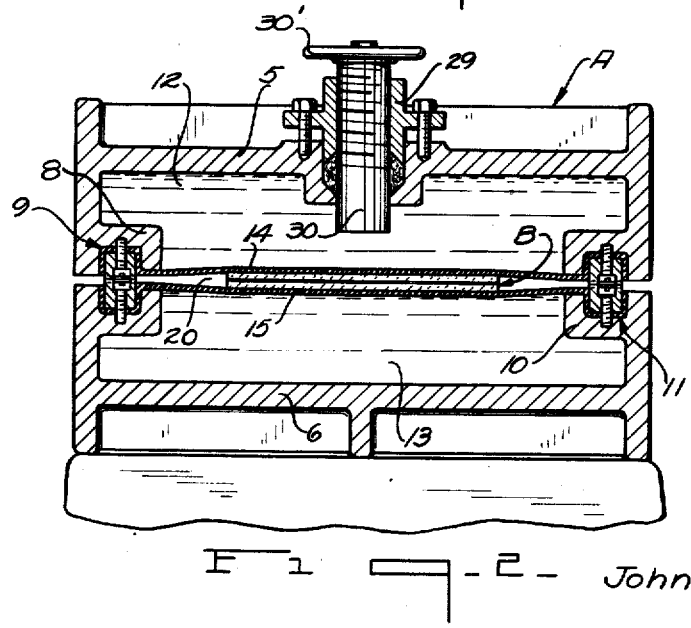
Fig. 2 is a vertical transverse section through the housing.

In accordance with the present invention, the use of a circulating liquid is eliminated and the heating of the bonding material and/or the interposed layer of non-brittle material together with the subsequent application of pressure upon the assembled sheets of material is effected, briefly stated, by the use of a non-circulating liquid such as glycerin, ethylene glycol, etc. the liquid being maintained in a substantially quiescent state and the pressure being created by displacement thereof.

Referring to the drawings, the improved apparatus provided by the present invention embodies a housing designated in its entirety by the letter A and within which housing is adapted to be placed the superimposed sheets or assembled layers of material which are to be united to form the laminated or composite sheet of glass. The housing A is preferably of a substantially rectangular formation and is composed of the upper and lower sections 5 and 6 respectively connected together at one end by means of a hinge 7 whereby the upper section 5 may be swung upwardly away from the lower section 6 when it is desired to place the assembled sheets to be joined therein or when it is desired to remove the finished composite sheet therefrom as will be more clearly hereinafter apparent.

The upper section 5 of the housing is preferably provided with an inwardly projecting substantially horizontal flange 8 extending entirely around the interior thereof as clearly shown and the undersurface of said flange is channeled out to provide a continuous channel or groove 9. The lower section 6 of the housing is also provided with an inwardly projecting horizontal flange 10 similar to and positioned directly beneath the upper flange 8, the lower flange 10 being likewise provided with a continuous channel or groove 11 similar to the upper channel 9 and facing the same.

The upper and lower sections 5 and 6 of the housing A are provided or formed with pressure chambers 12 and 13 respectively facing one another. Seated across the open faces of said pressure chambers and forming closures therefor are the flexible diaphragms 14 and 15 of any suitable material such as rubber, rubber composition or the like. Thus, the diaphragm 14 constitutes the bottom of the upper pressure chamber 12 while the diaphragm 15 constitutes the top of the lower pressure chamber 13. The side and end edges or border portions of the upper diaphragm 14 are received within the channel 9 of flange 8 and securely clamped therein by means of clamping strips 16 and screws 17, the heads of which are counter-sunken within said strips. The side and end edges or border portions of the lower diaphragm 15 are similarly received and secured within the channel 11 of the flange 10 by clamping strips 18 and screws 19.

The upper and lower diaphragms 14 and 15 cooperate to form a "sheet" containing compartment or chamber 20 therebetween for receiving the superimposed sheets or assembled layers of material to be joined and which are herein designated in their entirety B. The laminated sheet of glass herein shown by way of illustration is composed of two sheets of glass 21 and 22 between which is interposed a single sheet or layer of non-brittle material 23 although a greater or less number of sheets of glass and non-brittle material may be used if desired.

Extending transversely within the upper pressure chamber 12 and located at spaced points longitudinally thereof are a plurality of electric heating elements 25 while a plurality of similar electric heating elements 26 extend transversely within the lower pressure chamber 13 at spaced points longitudinally thereof. The top wall of the upper housing section 5 is formed with a recessed bearing portion 27 containing a suitable packing 28 held in place by the packing gland 29 is a plunger 30 controlled by means of a hand wheel or the like 30'. The purpose of the plunger 30 will be more clearly hereinafter described.

The present invention also includes means of a novel construction for securing or coupling the housing sections together during the uniting or joining operation. Carried by the free end of the upper section 5 of housing A are oppositely disposed brackets 33 (one only being shown) which form bearings for a shaft 34. Mounted upon this shaft 34 and eccentrically fixed thereto is a disk 35 provided in its outer surface with a groove 36. Loosely mounted upon the disk 35 is a hook member 37 the lower free end or hook portion 38 thereof being adapted to hook over or engage a catch 39 carried by the lower section 6 of housing A. The opposite or upper end of the hook member 37 is formed with a collar or strap 40 surrounding the disk 35 and carrying a stop pin 41 projecting into groove 36. The hook portion 38 and catch 39 are provided with correspondingly bevelled faces as shown so as to facilitate their movement into engagement with one another.

When the housing sections 5 and 6 are properly coupled together, the various parts of the coupling mechanism assume the positions shown by the full lines in Fig. 1 with the hook member and catch interengaged with one another and the stop pin 41 received within the top of groove 36. When it is desired to disconnect the housing sections, the shaft 34 is rotated in a clockwise direction and the disk 35 keyed thereto will naturally be rotated therewith. Upon initial rotation of said disk, the hook member 37 will be moved forwardly so as to disengage the hook portion 38 thereof from the catch 39.

During the rotation of disk 35, the pin 41 will run in the groove 36 but this groove is of a desired length so that as soon as the hook member is released from the catch, the stop pin will be engaged by the lower end wall of said groove and will be carried around with the disk whereby to swing the hook member entirely clear of the catch. The upper housing section can then be moved upwardly into the broken line position shown in Fig. 1 and when moved upwardly in this manner it will be apparent that the diaphragms will be separated so that the assembled layers of material can be placed within or the finished composite sheet removed from the housing or "sheet" containing compartment 20. When it is desired to again secure the housing sections together, the above cycle of operations is simply reversed. In other words, the shaft 34 is rotated in a counter-clockwise direction so that the hook member is first moved to engage the catch and drawn upwardly into locking engagement therewith.

In the operation of the present invention, the housing sections 5 and 6 are first disconnected and the upper section 5 raised to its broken line position indicated in Fig. 1 so that the diaphragms 14 and 15 are separated and the sheet containing compartment 20 readily accessible. The assembled sheets of material to be joined are then placed upon the lower diaphragm 15, the adjacent faces of said sheets having been previously coated with a suitable cement, adhesive or bonding material. The upper housing section is then lowered and the said sections secured together by the clamping means above described.

The pressure chambers 12 and 13 are adapted to be filled at all times with a suitable liquid such as glycerin, ethylene glycol, or the like and this liquid may be pumped into the pressure chambers through the bearing portion 27 upon removal of the plunger 30 or in any other desired manner. A portion of this liquid will pass from the upper chamber into the lower chamber in a manner to be hereinafter more clearly described whereby the amount of liquid in the upper and lower chambers will be substantially the same, and the pressure upon the upper and lower diaphragms substantially equalized. A gauge 31 may be provided for determining the pressure within the pressure chambers.

The electric heating elements 25 and 26 are then placed in operation and the liquid heated to a predetermined temperature and maintained at such temperature for a desired period of time required to properly soften the bonding material and/or the interposed layer or layers of non-brittle material. After the required softening has been obtained, the pressure upon the diaphragms and the contents thereof is adapted to be increased so as to press the assembled sheets of material together to effect the uniting or joining thereof. The pressure within the pressure chambers is built up by displacing the desired amount of liquid. In other words, the liquid is non-compressible so that as the plunger 30 is forced downwardly into the liquid and caused to displace a portion thereof, there will be built up within the pressure chambers a pressure proportional to the liquid displaced. During the pressing operation the temperature of the liquid may or may not be increased as desired. After the pressing operation, the plunger is raised out of the liquid so that the pressure upon the diaphragms will be reduced. The housing sections can then be separated so that the finished composite sheet may be removed from the compartment 20. Any air that may be trapped within the "sheet" containing compartment 20 at the beginning of the pressing operation will be forced outwardly between the diaphragms through the air holes 56 formed in the clamping strips 16 and 18 upon application of pressure to the diaphragms.

It is of course desirable, in order that a uniform bond may be obtained between the laminations, that the pressure upon the upper and lower diaphragms be as nearly uniform as possible and in order that the pressure upon the laminations from above and beneath may be more or less equalized, the hinge 7 is of a peculiar novel construction to allow for an equalization of the pressure within the pressure chambers. In the construction of the hinge, the upper housing section 5 is provided with two spaced hinge parts 42 and 43 while the lower housing section 6 is provided with a single hinge part 44 received between the hinge parts 42 and 43. Passing through the three hinge parts 42, 43 and 44 is a shaft 45 about which the upper housing section 5 is adapted to pivot as it is raised or lowered. The shaft 45 is provided with a bore 46 terminating short of the opposite ends thereof so that the said opposite ends are closed to the atmosphere. The shaft is also provided with three annular grooves or recesses 47, 48 and 49 communicating with the bore of shaft 45 by transverse passages 50, 51 and 52 respectively. Leading from the upper pressure chamber 12 are conduits 53 and 54 communicating with the recesses 47 and 49 respectively while leading from the lower pressure chamber 13 is a conduit 55 communicating with groove or recess 48. By means of the construction just described, the upper and lower pressure chambers 12 and 13 are in communication with one another at all times so as to allow for an equalization of the pressures therein.

Thus, when the pressure within the upper chamber 12 becomes greater than that in the lower chamber 13 a certain amount of this pressure will pass from the upper chamber through conduits 53 and 54 into recesses 47 and 49, through the passages 50 and 52 into the bore 46 of shaft 45, then outwardly of the bore through the passage 51 into recess 48, and thence into the lower chamber through conduit 55. Should the pressure within the lower chamber become greater than that in the upper chamber, a certain amount of the liquid will pass from the lower chamber into the said upper chamber in the reverse direction to that above described. Explaining more fully, the air will pass from the lower pressure chamber through conduit 55 into recess 48, through passage 51 into bore 46 of shaft 45, through bore 46 in opposite directions and out through passages 50 and 52 into recesses 47 and 49, and thence through conduits 53 and 54 into the upper pressure chamber.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of laminated glass, a housing composed of relatively movable upper and lower sections having pressure chambers facing one another, a diaphragm across the open face of each chamber constituting a closure therefor, the assembled sheets of material to be joined being received between the diaphragms, means for placing said pressure chambers in communication with one another, a non-circulating liquid contained within the pressure chambers and maintained therein in a substantally quiescent state, and a movable plunger projecting into one of the pressure chambers for displacing the liquid therein to build up a pressure within said pressure chambers to effect the union of the assembled sheets of material.

2. In apparatus for the manufacture of laminated glass, a housing composed of upper and lower sections having pressure chambers facing one another, a diaphragm across the open face of each chamber constituting a closure therefor, the assembled sheets of material to be joined being received between the diaphragms, a non-circulating liquid contained within the pressure chambers and maintained therein in a substantially quiescent state, a movable plunger projecting into one of the pressure chambers for displacing the liquid therein to build up a pressure within said chambers to effect the union of the assembled sheets of material, and means for connecting said upper and lower sections together, said connecting means being provided with conduits placing the upper chamber in communication with the lower chamber.

3. In apparatus for the manufacture of laminated glass, a housing composed of upper and lower sections having pressure chambers facing one another, a diaphragm across the open face of each chamber constituting a closure therefor, the assembled sheets of material to be joined being received between the diaphragms, a non-circulating liquid contained within the pressure chambers and maintained therein in a substantially quiescent state, a movable plunger projecting into one of the pressure chambers for displacing the liquid therein to build up a pressure within said chambers to effect the union of the assembled sheets of material, and a hinge construction for pivotally connecting said upper and lower sections together at one end, said hinge construction being provided with conduits placing the upper chamber in communication with the lower chamber.

Signed at Toledo, in the county of Lucas and State of Ohio, this 29th day of May, 1928.

JOHN L. DRAKE.

CERTIFICATE OF CORRECTION.

Patent No. 1,872,692. August 23, 1932.

JOHN L. DRAKE.

It is hereby certified that error appears in the printed specification of the above numbered patent requiring correction as follows: Page 2, line 95, after the numeral "29" insert a period and the words "Threaded through the packing gland 29"; and that the said Letters Patent should be read with this correction therein that the same may conform to the record of the case in the Patent Office.

Signed and sealed this 6th day of December, A. D. 1932.

(Seal)

M. J. Moore,
Acting Commissioner of Patents.